United States Patent [19]

Minami

[11] Patent Number: 5,436,931
[45] Date of Patent: Jul. 25, 1995

[54] FSK RECEIVER

[75] Inventor: Yoichiro Minami, Tokyo, Japan

[73] Assignee: NEC Corporation, Tokyo, Japan

[21] Appl. No.: 54,257

[22] Filed: Apr. 30, 1993

[30] Foreign Application Priority Data

May 6, 1992 [JP] Japan .................. 4-140954

[51] Int. Cl.$^6$ .................. H03D 3/00; H04L 27/14; H04L 27/08
[52] U.S. Cl. .................. 375/334; 375/545
[58] Field of Search .................. 375/88, 98, 45, 80; 329/300, 301, 302

[56] References Cited

U.S. PATENT DOCUMENTS

| 4,193,034 | 3/1980 | Vance .................. 375/88 |
| 4,521,892 | 6/1985 | Vance et al. .................. 375/88 |
| 4,866,395 | 9/1989 | Hostetter . | |
| 4,910,467 | 3/1990 | Leitch .................. 375/98 |
| 5,015,961 | 5/1991 | Springer et al. .................. 375/88 |
| 5,029,182 | 7/1991 | Cai et al. .................. 375/98 |

FOREIGN PATENT DOCUMENTS

| 0371700 | 6/1990 | European Pat. Off. . |
| 0394064 | 10/1990 | European Pat. Off. . |
| 0417528 | 3/1991 | European Pat. Off. . |
| 0066076 | 12/1992 | European Pat. Off. . |

Primary Examiner—Stephen Chin
Assistant Examiner—Huong Luu
Attorney, Agent, or Firm—Sughrue, Mion, Zinn, Macpeak & Seas

[57] ABSTRACT

An FSK receiver includes an amplifier, a local oscillation circuit, a mixer circuit, a limiter circuit, a demodulation circuit, a current detecting circuit, and a control circuit. The amplifier amplifies a received wave frequency-modulated with a binary digital signal. The local oscillation circuit outputs a local oscillation frequency signal. The mixer circuit mixes an amplified output from the amplifier with the local oscillation frequency signal. The limiter circuit receives a baseband signal component output from the mixer circuit to limit an amplitude. The demodulator samples the binary signal from the limiter circuit with a sampling signal generated by the received wave. The current detecting circuit detects a current flowing in the mixer circuit. The control circuit controls the gain of the amplifier in accordance with an output from the current detecting circuit.

8 Claims, 5 Drawing Sheets

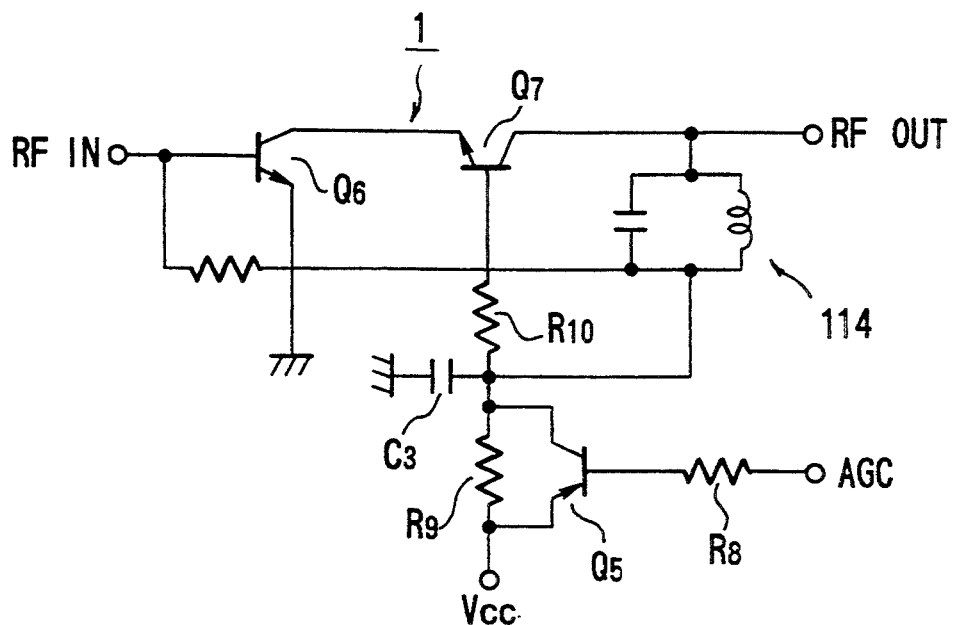
F I G. 5
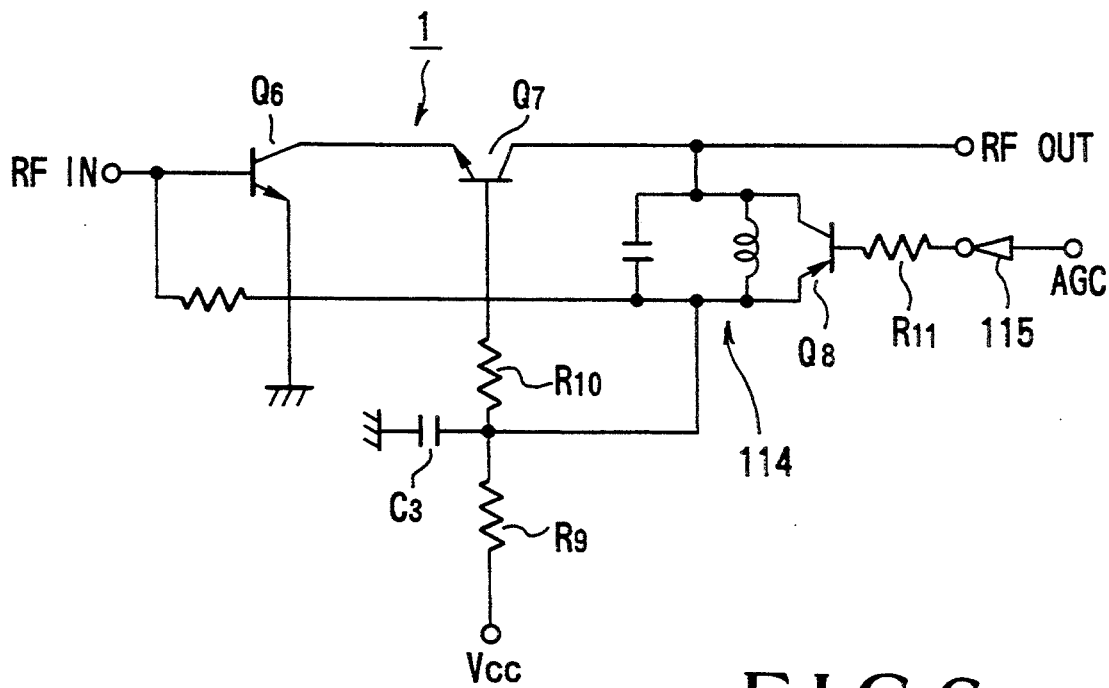
F I G. 6

FSK RECEIVER

BACKGROUND OF THE INVENTION

The present invention relates to an FSK (Frequency Shift Keying) receiver and, more particularly, to an FSK receiver in which a wave frequency-modulated with a binary digital signal by an FSK modulating scheme is received by a quadrature detecting scheme.

In recent years, a compact receiver has been developed in accordance with the progress of an integrated circuit technique. However, in the field of radio communications, since the basic circuit design has not changed, a decrease in size of the receiver almost reaches its limitation due to the presence of elements which cannot be integrated or which cannot easily be integrated. For example, in a superheterodyne receiver, a high-frequency filter, an intermediate frequency filter, and the like occupy a large area.

By entirely changing the basic circuit design, a circuit system without a high-frequency filter, an intermediate frequency filter, and the like which occupy a large area has been proposed. For example, a direct conversion scheme in an FSK receiver is known. This direct conversion scheme, as described in, e.g., U.S. Pat. No. 4,521,892, a channel frequency is set equal to a local oscillation frequency to generate a beat component between the frequency of a received signal and the local oscillation frequency, and only a baseband signal is extracted by a low-pass filter. The beat component is amplitude-limited by a limiter and then demodulated.

The direct conversion scheme has the following characteristic feature. Since the channel frequency is equal to the local oscillation frequency, an intermediate frequency becomes zero and no image frequency is present. This means that any filter, having excellent selectivity, for attenuating an image frequency is not required in a high-frequency amplifier and an intermediate frequency amplifier. Therefore, a compact, lightweight FSK receiver using the direct conversion scheme can be obtained.

A channel filter for attenuating an adjacent channel interference wave can be constituted by a low-frequency active filter because the intermediate frequency of the channel filter is zero. This channel filter can advantageously be realized in integrated circuit.

As described above, a high-frequency filter, an intermediate frequency filter, and the like are not required by employing the direct conversion scheme, and a compact, lightweight FSK receiver can be obtained. However, a conventional direct conversion scheme uses quadrature baseband signals, and a mixer circuit which must have a single-balance type circuit arrangement.

This single-balance type circuit is easily saturated when a field intensity is increased. In particular, when a power supply voltage is low, this saturation is conspicuous. When the saturation occurs, intermodulation easily occurs to degrade circuit characteristics. A market in the field of communications has been active in recent years, and the frequency of use of radio waves is increased, so that a field intensity is locally increased. As a result, intermodulation easily occurs.

SUMMARY OF THE INVENTION

It is an object of the present invention to provide an FSK receiver having improved intermodulation characteristics.

It is another object of the present invention to provide an FSK receiver capable of preventing saturation of a single-balance type mixer circuit at a high field intensity.

It is still another object of the present invention to provide a compact, lightweight FSK receiver.

In order to achieve the above objects, according to the present invention, there is provided an FSK receiver comprising amplifying means for amplifying a received wave frequency-modulated with a binary digital signal, local oscillating means for outputting a local oscillation frequency signal, mixer means for mixing an amplified output from the amplifying means with the local oscillation frequency signal, limiter means for receiving a baseband signal component output from the mixer means to limit an amplitude, demodulating means for sampling the binary signal from the limiter means with a sampling signal generated by the received wave, current detecting means for detecting a current flowing in the mixer means, and control means for controlling a gain of the amplifying means in accordance with an output from the current detecting means.

BRIEF DESCRIPTION OF THE DRAWINGS

FIG. 5 is a circuit diagram showing an arrangement of a high-frequency amplifier 1 to explain an AGC operation of the present invention;

FIG. 6 is a circuit diagram showing another arrangement of the high-frequency amplifier 1 to explain an AGC operation of the present invention.

DESCRIPTION OF THE PREFERRED EMBODIMENT

Figure 1:
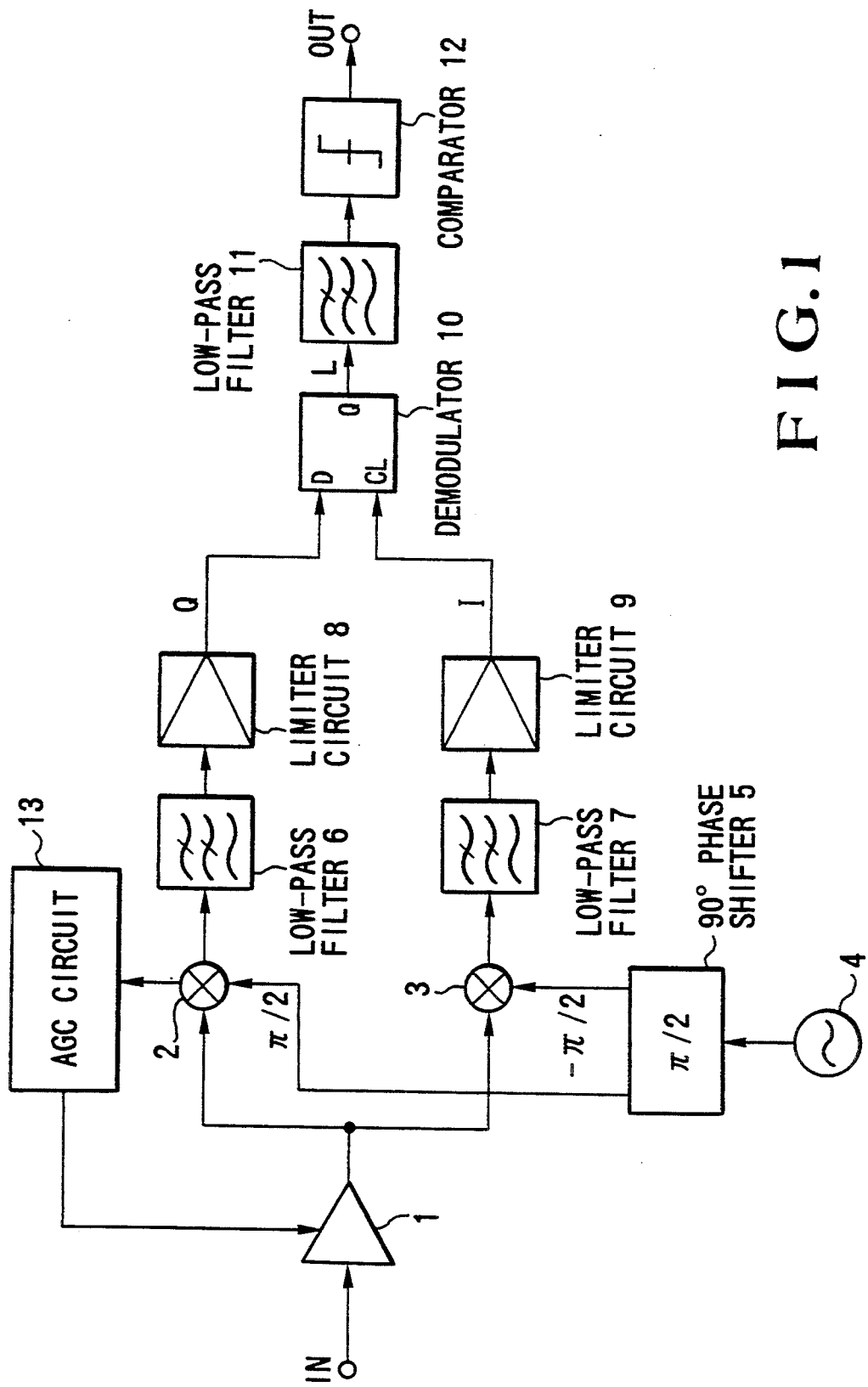
FIG. 1 is a block diagram showing an embodiment of an FSK receiver according to the present invention.

An embodiment of the present invention will be described below with reference to the accompanying drawings. FIG. 1 shows an embodiment of the present invention. A received wave which is frequency-modulated with a binary digital signal of a mark or space and input to an input terminal IN is amplified by a high-frequency amplifier 1 and is divided into two components to be input to mixer circuits 2 and 3, respectively. The other input to the mixer circuit 2 is a frequency signal obtained by shifting a local oscillation frequency from a local oscillation circuit 4 by +45° by means of a 90° phase shifter 5, and the other input to the mixer circuit 3 is a frequency signal obtained by shifting the local oscillation frequency from the local oscillation circuit 4 by −45° by means of the 90° phase shifter 5.

Baseband signals phase-shifted by 90° from each other are obtained from the mixer circuits 2 and 3 each receiving an output from the high-frequency amplifier 1 and an output from the 90° phase shifter 5. In this case, as described above, since a channel frequency is equal to the local oscillation frequency from the local oscillation circuit 4, the baseband signals have a beat frequency. Low-pass filters 6 and 7 extract only the baseband signal components, thereby limiting noise bands.

The extracted baseband signal components are input to limiter circuits 8 and 9, respectively, and a binarized I signal (Inphase signal component) and a binarized Q signal (Quadrature signal component) are obtained. The I and Q signals are input to a demodulator 10 constituted by a D flip-flop so as to be demodulated.

Figure 2:
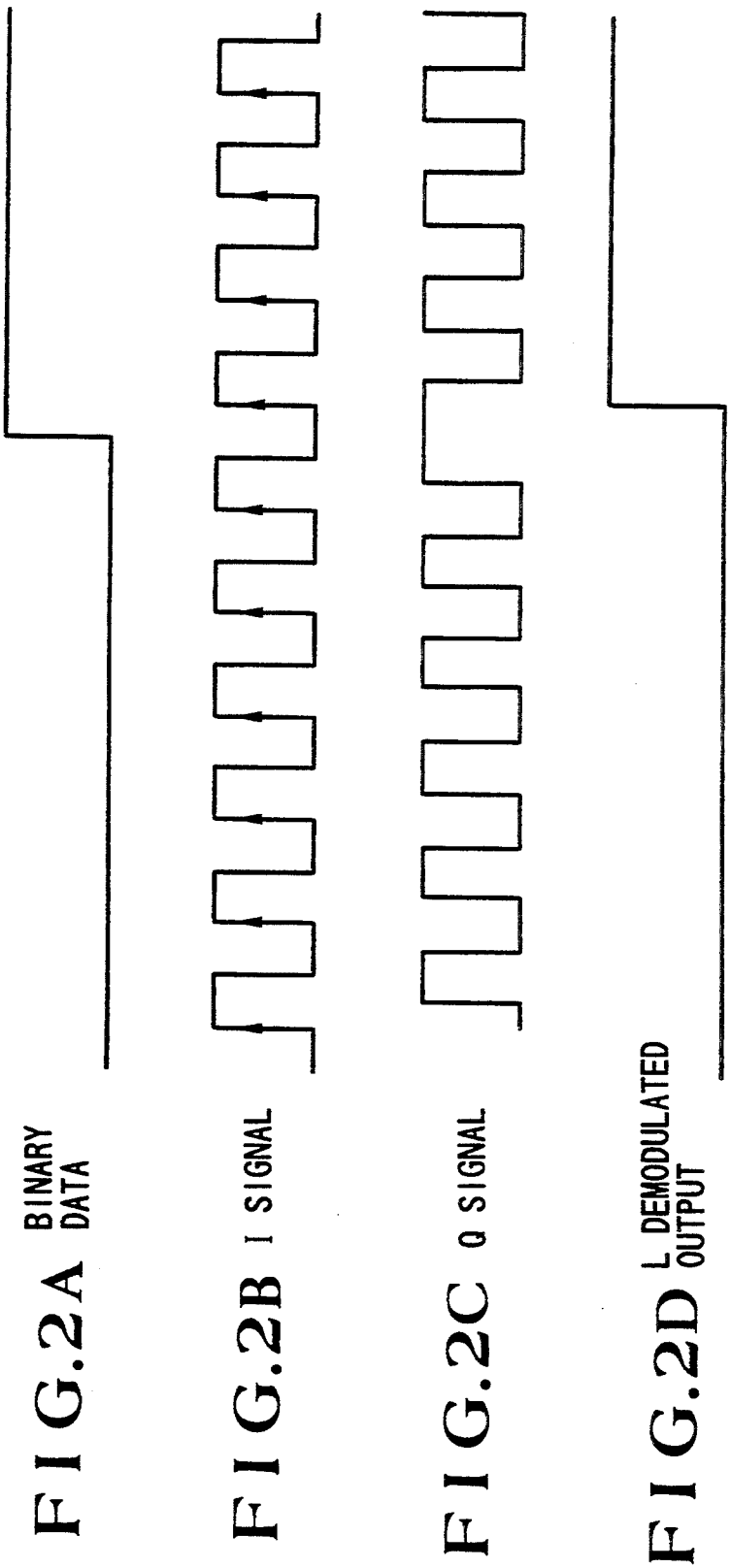
FIGS. 2A-2D are a timing chart showing an operation of a demodulator 10 in the embodiment in FIG. 1.

The Q signal shown in FIG. 2C is input to a data input terminal D of the D flip-flop constituting the demodulator 10, the I signal shown in FIG. 2B is input to a clock input terminal CL, and the Q signal is received in response to the leading edge of the I signal. In this case, a demodulated output L shown in FIG. 2D appears at the Q output terminal of the flip-flop. The demodulated output L is input to a comparator 12 through a low-pass filter 11 for reducing noise and is binarized, and the demodulated output L appears at an output terminal OUT as a binary digital signal corresponding to binary data on the transmission side shown in FIG. 2A.

Although the above arrangement is known well, according to the present invention, an Automatic Gain Control (AGC) circuit 13 is added to the arrangement to prevent saturation so as to obtain good intermodulation characteristics of the mixer circuit 2. This AGC circuit 13 detects a current flowing in the mixer circuit 2 to control the gain of the high-frequency amplifier 1 in accordance with the detected current.

Figure 3:
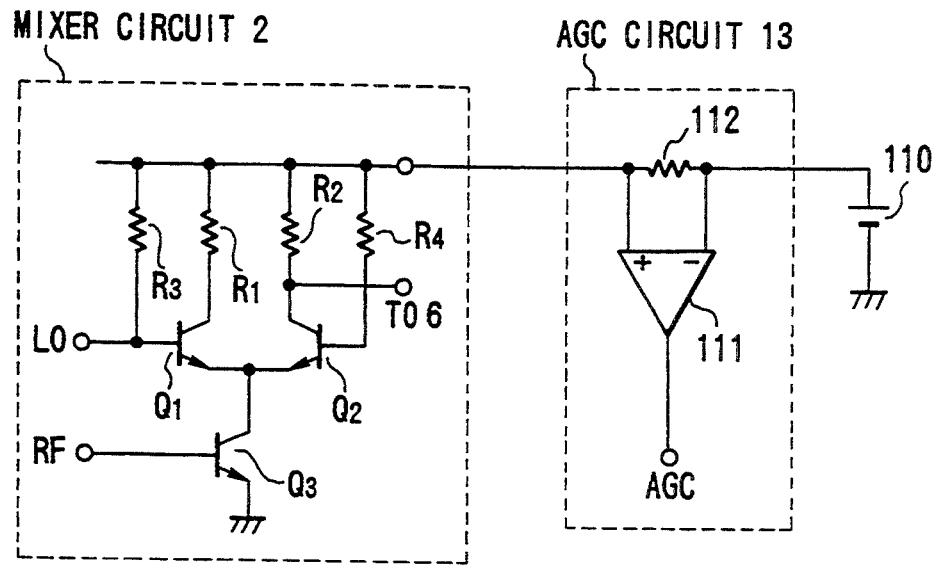
FIG. 3 is a circuit diagram showing an arrangement of an AGC circuit 13 in the embodiment in FIG. 1.

FIG. 3 shows the mixer circuit 2 and the AGC circuit 13 in the embodiment of the present invention. The mixer circuit 2 is a single-balance type circuit, and is constituted by differential transistors $Q_1$ and $Q_2$ which are emitter-connected, a current source transistor $Q_3$ connected between ground and the common connection point between the emitters of the differential transistors $Q_1$ and $Q_2$, and resistors $R_1$ to $R_4$ which are respectively connected between a power supply line extending from the AGC circuit 13 and the collectors and bases of the transistors $Q_1$ and $Q_2$. An RF (high-frequency) signal from the high-frequency amplifier 1 is supplied to the base of the transistor $Q_3$, a local oscillation signal from the 90° phase shifter 5 is supplied to the base of the transistor $Q_1$, and a beat component to be supplied to the low-pass filter 6 is extracted from the collector of the transistor $Q_2$.

The AGC circuit 13 is constituted by a resistor 112 inserted in series with a supply line extending from a power supply 110 of the mixer circuit 2 and a differential amplifier 111, having both terminal voltages of the resistor 112 as differential inputs, for outputting a control signal to the high-frequency amplifier 1.

When a receiving operation is performed in a area having a high field intensity, the mixer circuit 2 performs a saturation operation in response to a large-amplitude RF signal supplied to the base of the transistor $Q_3$. For this reason, the average current (power supply current) of the mixer circuit 2 is increased, and the current is detected by the resistor 112 and converted into both terminal voltages of the resistor 112. In this manner, an AGC voltage applied from the differential amplifier 111 to the high-frequency amplifier 1 is generated in accordance with the average current of the mixer circuit 2.

The AGC circuit 13 is constituted by the differential amplifier 111 such that the AGC voltage is generated in proportion to the value of the average operating current of the mixer circuit 2. However, the AGC circuit 13 may be constituted by a comparator in place of the differential amplifier 111. In this case, the AGC voltage may be generated when the value of the operating average current of the mixer circuit 2 is larger than a predetermined value.

Figure 4:
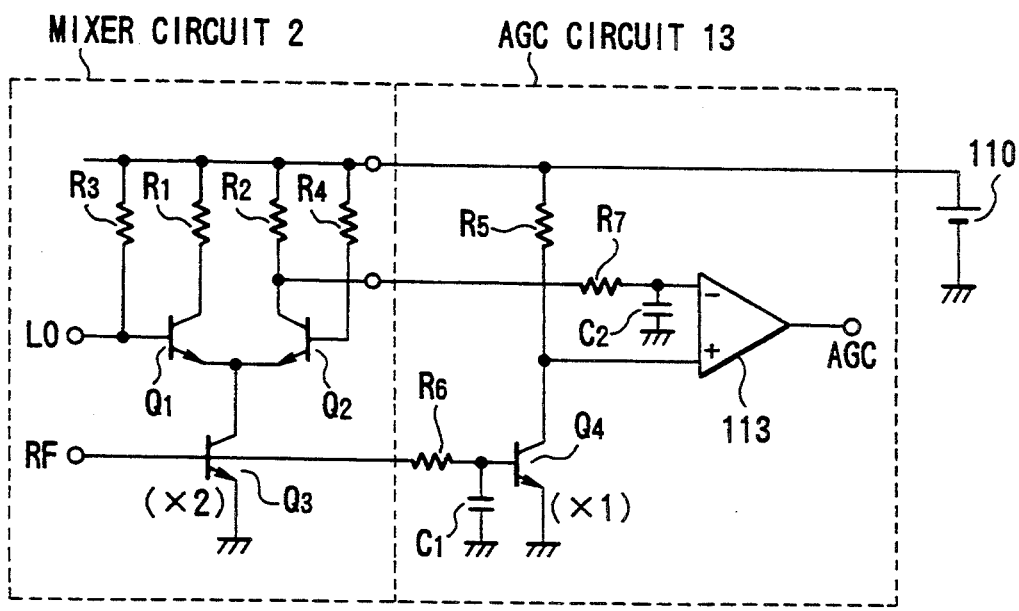
FIG. 4 is a circuit diagram showing another arrangement of the AGC circuit 13 in the embodiment in FIG. 1.

FIG. 4 shows another arrangement of the AGC circuit. The same reference numerals as in FIG. 3 denote the same parts in FIG. 4. Since a circuit current is increased upon saturation of a mixer circuit 2, a bias voltage of the output terminal of the mixer circuit 2, i.e., the collector of the transistor $Q_2$ is decreased. Therefore, in this arrangement, a change in bias voltage is detected by a comparator 113 to generate an AGC voltage.

More specifically, an output voltage from the mixer circuit 2 is integrated by a resistor $R_7$ and a capacitor $C_2$ to obtain an average value, and the average value is used as one input to the comparator 113. As a reference voltage serving as the other input, a drop voltage obtained by dropping a power supply voltage through a resistor $R_5$ is used. The resistor $R_5$ has the same resistance as that of the resistor $R_2$, and a current equal to a current flowing in the collector of the transistor $Q_2$ in a non-signal state is supplied to the resistor $R_5$.

For this purpose, a transistor $Q_4$ in which a current having a value ½ that of the current from a current source transistor $Q_3$ flows is arranged, and this current is supplied to the resistor $R_5$ to have a value equal to a current value in a non-signal state, thereby generating the reference voltage of the comparator 113.

Note that a resistor $R_6$ and a capacitor $C_1$ constitute an integration circuit for preventing a high-frequency signal from being mixed in the current to the current source transistor $Q_4$.

In this arrangement, a differential amplifier may be used in place of the comparator 113, so that an AGC voltage is generated in accordance with a difference between differential inputs.

An AGC operation of the high-frequency amplifier 1 using the AGC voltages shown in FIGS. 3 and 4 will be described below. Referring to FIG. 5, the high-frequency amplifier 1 is constituted by an emitter-grounded transistor $Q_6$, a base-grounded transistor $Q_7$, and an LC tank circuit 114. The LC tank circuit 114 selectively outputs an RF signal. A circuit power supply voltage Vcc is applied to the high-frequency amplifier 1 through base resistors $R_9$ and $R_{10}$ of the transistor $Q_7$. Note that a capacitor $C_3$ is a noise-reduction capacitor.

In this embodiment, a pnp transistor $Q_5$ is connected to both terminals of the resistor $R_9$ connected in series with the power supply line, and the AGC voltage from the AGC circuit 13 is applied to the base of the transistor $Q_5$ through a resistor $R_8$. For example, the AGC voltage goes to a high level at a high field intensity, and the AGC voltage goes to a low level at a low field intensity. At the low field intensity, the transistor $Q_5$ is turned on to short-circuit the resistor $R_9$, so that the power supply current is not limited. At the high field intensity, since the resistor $R_9$ is inserted in the power supply line, the power supply current is limited, thereby decreasing a gain.

Therefore, when the AGC voltage is gradually increased in accordance with an increase in field intensity, the impedance of the pnp transistor $Q_5$ is gradually increased accordingly to cause the resistor $R_9$ to gradually limit the current, so that the gain can be controlled.

In an arrangement shown in FIG. 6, a pnp transistor $Q_8$ is parallelly connected to the LC tank circuit 114 serving as an output circuit, and an AGC voltage is applied to the base of the pnp transistor $Q_8$ through an inverter 115 and a resistor $R_{11}$. When the AGC voltage goes to a high level at a high field intensity, the transistor $Q_8$ is turned on to set the LC tank circuit 114 in a short-circuited state, thereby decreasing the impedance of the LC tank circuit 114. In this manner, a circuit gain is decreased.

In this arrangement, when the AGC voltage is changed in accordance with a field intensity, the impedance of the LC tank circuit 114 can be controlled by gradually changing the impedance of the transistor $Q_8$.

Figure 7:
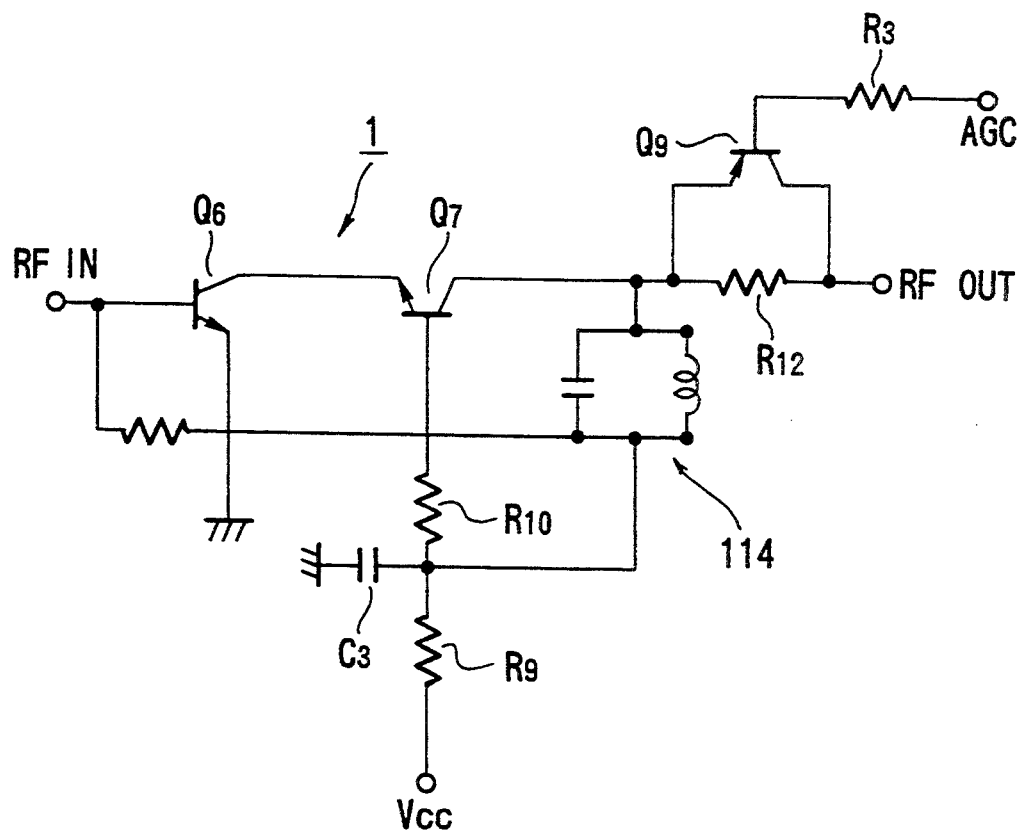
FIG. 7 is a circuit diagram showing still another arrangement of the high-frequency amplifier 1 to explain an AGC operation of the present invention.

In an arrangement in FIG. 7, a resistor $R_{12}$ is connected in series with the RF output line of the high-frequency amplifier 1, i.e., the collector output line of the transistor $Q_7$, and a transistor $Q_9$ is connected to both terminals of the resistor $R_{12}$. It is clearly understood that in the arrangement in FIG. 7 the impedance of the transistor $Q_9$ may be controlled in accordance with an AGC voltage applied to the transistor $Q_9$ through a resistor $R_{13}$ to change a combined impedance of the resistor $R_{12}$ and the transistor $Q_9$, and various modifications can be effected.

As has been described above, according to the present invention, since saturation of a mixer circuit can be prevented at a high field intensity, intermodulation characteristics can advantageously be improved.

What is claimed is:

1. A Frequency Shift Keying (FSK) receiver comprising:
   amplifying means for amplifying a received wave frequency-modulated with a binary digital signal;
   local oscillating means for outputting a local oscillation frequency signal;
   mixer means for mixing an amplified output from said amplifying means with the local oscillation frequency signal; wherein said mixer means receives a power supply current from a power supply;
   limiter means for receiving a baseband signal component output from said mixer means to obtain a binary signal;
   demodulating means for sampling the binary signal from said limiter means with a sampling signal generated by the received wave;
   current detecting means for detecting said power supply current flowing in said mixer means; and
   control means for controlling a gain of said amplifying means in accordance with an output from said current detecting means.

2. A receiver according to claim 1, wherein said current detecting means comprises a detecting resistor inserted in series with a power supply line of said mixer means and means for outputting a control signal in accordance with a terminal voltage of said detecting resistor.

3. A receiver according to claim 1, wherein said current detecting means comprises means for outputting a control signal in accordance with an output DC voltage from said mixer means.

4. A receiver according to claim 1, wherein said control means comprises a bias current control means for controlling a bias current from said amplifying means in accordance with said output from the current detecting means.

5. A receiver according to claim 1, wherein said control means comprises impedance control means for controlling an impedance of an output circuit of said amplifying means in accordance with said output from said current detecting means.

6. A receiver according to claim 5, wherein said output circuit comprises a parallel resonance circuit, and said impedance control means controls an impedance of said parallel resonance circuit.

7. A receiver according to claim 5, wherein said output circuit comprises a resistor, and said impedance control means controls a DC impedance of said resistor.

8. A receiver according to claim 1, wherein said control means comprises a transistor which is parallelly connected to a resistor for controlling a gain of said amplifying means and has an impedance controlled by said output from said current detecting means.

* * * * *